March 8, 1932.  W. F. HUGHES  1,848,887
FRICTION CLUTCH
Filed Dec. 16, 1929   2 Sheets-Sheet 1
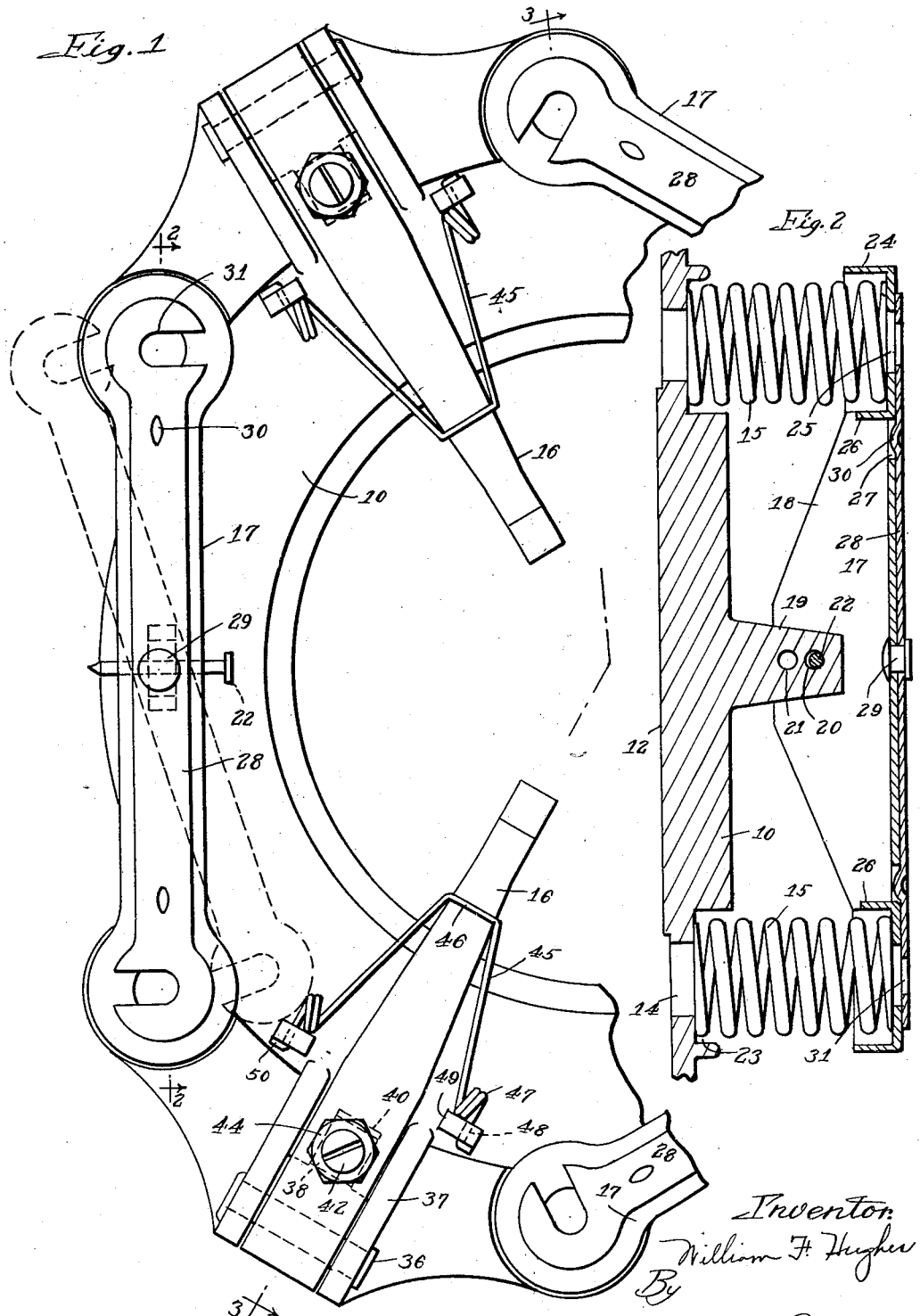

March 8, 1932. W. F. HUGHES 1,848,887
FRICTION CLUTCH
Filed Dec. 16, 1929 2 Sheets-Sheet 2
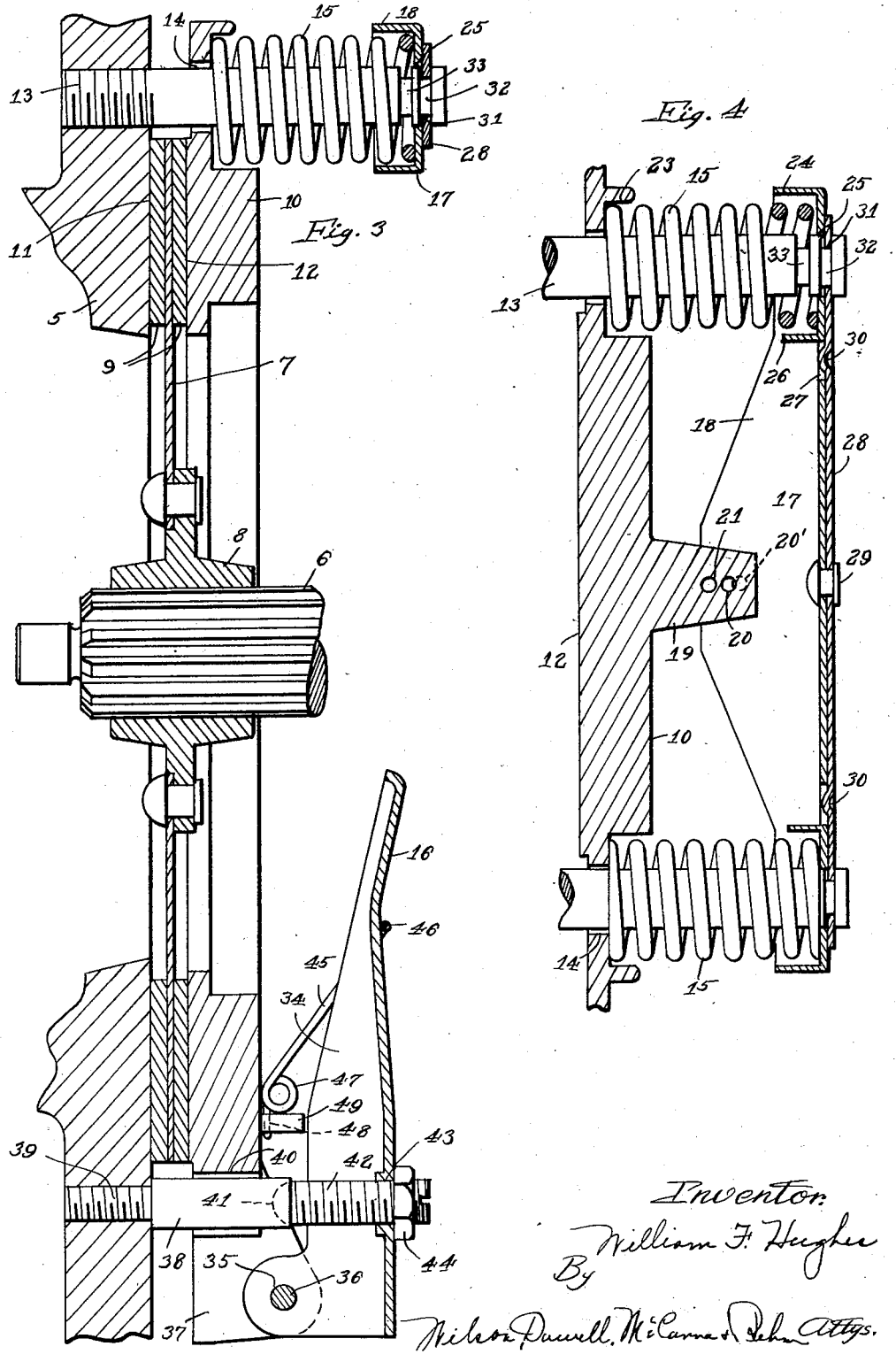

Patented Mar. 8, 1932

1,848,887

UNITED STATES PATENT OFFICE

WILLIAM E. HUGHES, OF ROCKFORD, ILLINOIS, ASSIGNOR TO ROCKFORD DRILLING MACHINE CO., OF ROCKFORD, ILLINOIS, A CORPORATION OF ILLINOIS

FRICTION CLUTCH

Application filed December 16, 1929. Serial No. 414,273.

This invention relates to friction clutches especially adapted for use on motor vehicles.

The clutch of my invention is one principally characterized by the elimination of the usual back plate. Clutches of this kind have been in popular demand in recent years. It is common practice in the case of these clutches for the car manufacturer to have the back face of the flywheel machined and ground and fitted with projecting studs located according to the specifications of the clutch to be used, and the clutch manufacturer provides the clutch disc and pressure plate together with the springs therefor. But, aside from the assembling of the release levers on the pressure plate, the clutch had to be assembled piece by piece directly on the car. This required considerable time and slowed down production and, of course, involved extra labor cost. It is, therefore, the principal object of my invention to provide a clutch wherein the pressure plate assembly is so constructed that the assembling of the clutch on the flywheel is reduced to a few simple operations which do not even involve the threading of nuts on the studs, and can be completed in a small fraction of the time otherwise required.

According to my invention, the pressure plate not only has the release levers assembled thereon when shipped to the car manufacturer, but has covers holding the springs caged and under compression so that they can be slipped over the studs into proper position all at one time when the pressure plate is placed on the flywheel. Furthermore, the covers are each equipped with locking levers arranged to be turned to an out-of-the-way position to permit the passage of the ends of the studs through holes in the covers in the positioning of the pressure plate and subsequently turned back to engage in annular grooves provided therefor in the projecting ends of the studs, whereby to assemble the covers on the studs and thereby hold the springs in place. It is a feature of my invention to provide pins inserted at the time the springs are assembled on the pressure plate for quickly detachably securing the covers to lugs provided on the pressure plate and holding the springs caged and under compression, these pins being arranged to be pulled out after the locking of the covers to the studs, as just described. It is a still further feature of my invention to provide two holes in each of the lugs on the pressure plate and two sets of annular grooves in the studs on the flywheel, correspondingly spaced, and to enter the pin for each cover in the one hole when the clutch is shipped to the car manufacturer and enter the locking levers in the one set of grooves at the time of initial assembly of the clutch on the flywheel, the other hole in each lug being arranged to be used later after the clutch has been worn to a predetermined extent, when a pin may be entered therein to fasten each cover to the pressure plate with the springs placed under compression to permit the entering of the locking levers in the other set of grooves. Thus, I provide for a simple take-up for wear and make it practical to use a lighter spring pressure on the pressure plate when the clutch is new, instead of having the clutch overloaded with spring pressure at the time the clutch is new in order to allow for the wear, as is now the practice, that practice being objectionable because it makes the clutch hard to operate.

The invention is fully described in the following specification in which reference is made to the accompanying drawings, wherein—

Figure 1 is a rear view of the pressure plate assembly, showing the same as it is arranged to be shipped to the car manufacturer, the right half of the assembly being broken away to permit showing the rest on a larger scale;

Fig. 2 is a section on the line 2—2 of Fig. 1 illustrating how each pair of springs is held caged and under compression by means of a cover pinned to a lug on the pressure plate;

Fig. 3 is a section of the clutch assembled on the flywheel, the pressure plate appearing in section as viewed on the line 3—3 of Fig. 1, and Fig. 4 is a section similar to Fig. 2 but showing the cover locked to studs on the flywheel and the pin for fastening the cover to the pressure plate removed.

The same reference numerals are applied to corresponding parts throughout the views.

As stated above, my invention has reference to a clutch built without the usual back plate to serve as a backing for the springs acting against the pressure plate and as a mounting for release levers for actuating the pressure plate. Most clutches of this kind provided in the past have been of more or less complicated and expensive construction and were difficult to assemble and unhandy to adjust. My invention has for its principal object the simplification and cheapening of the construction of a clutch of this kind permitting of much easier assembling as well as handier adjustment.

Referring first to Fig. 3, the reference numeral 5 designates a flywheel, only a portion of which is shown, it being understood that the same is mounted in the usual way on the rear end of the automobile crank shaft. The flywheel, of course, constitutes the driving element of the clutch. A shaft 6, constituting the driven element, ordinarily extends rearwardly from the clutch into the gear box of the transmission, there being a housing about the flywheel and clutch assembly at the front end of the gear box, as is well known. The housing usually has an inspection plate which, when removed, affords access to the clutch for purposes of adjustment. The clutch disc appears at 7 carried on a hub 8 splined, as shown, on the forward end of the shaft 6. The disc has the usual pads or facings 9 on opposite sides of the marginal portion thereof disposed for engagement with the flywheel 5 and pressure plate 10. The back face 11 of the flywheel 5 is ground smooth and square with the axis and the same is true of the front face 12 of the pressure plate 10. The clutch, as thus far described, is of ordinary construction and no invention is, of course, claimed in these details excepting only insofar as they form a part of the novel combination hereinafter described. In passing, it may be stated that it is also common practice to provide springs mounted on studs projecting from the back of the flywheel for urging the pressure plate toward the flywheel to frictionally engage the disc 7 therebetween, and that it is likewise common practice to provide release levers mounted on the pressure plate and fulcrumed on studs projecting from the back of the flywheel and arranged to be actuated by a throw-out sleeve, the latter being operated by a yoke which, in turn, is operated by a foot pedal, in a manner well known in this art.

According to my invention, the car manufacturer has the flywheel 5 provided not only with the ground face 11 but also with a plurality of studs 13 located according to the specifications of the clutch to be used. The clutch manufacturer casts the pressure plate 10 with cored out holes 14, correspondingly located, so as to permit projection of the studs 13 therethrough, as shown in Fig. 3. A coiled compression spring 15 is provided for each stud. It is common to provide six studs and six springs therefor, the studs being preferably provided at either side of a release lever 16, of which there are three. It was heretofore the practice to have the projecting end of each stud threaded for reception of a nut to complete the assembling of each spring. The trouble with that practice was that it necessitated six separate and distinct assembling operations for the springs alone and the handling of a multiplicity of parts, all of which meant slowed down production and high labor cost. The springs 15, in accordance with my invention, are arranged to be caged in pairs and held under compression by covers 17 reaching from one stud to the next between two adjoining release levers (see Fig. 1). These covers, which I prefer to stamp from sheet metal for the sake of cheapness and lightness, are suitably channel-shaped in cross-section for maximum strength and rigidity. Flanges 18 are thus presented on each cover at opposite sides of a lug 19 suitably cast integral with the back of the pressure plate 10 approximately midway between the holes 14 through which the pair of studs 13 arranged to cooperate with the pair of springs 15 are arranged to be entered. Two transverse holes 20 and 21 are provided in the lug 19 through one of which a nail or any other form of pin 22, is arranged to be passed to quickly detachably secure the cover 17 to the pressure plate 10 holding the pair of springs 15 under compression as illustrated in Fig. 2. That is the way all of the springs are arranged to be held caged and under compression on the pressure plate as the clutch is shipped to the car manufacturer. Suitable recesses 23 are shown cast in the back of the pressure plate 10 for the seating of the springs 15. The ends of each of the covers 17 are formed with circular flanges 24, concentric with holes 25 punched in the ends of the cover, so as to hold the other ends of the springs 15 in position. Lugs 26 are struck inwardly from the back of each cover further to retain the springs 15, and the small slots 27 which are thus formed in the back of the cover are taken advantage of to hold a locking lever 28 in place. The lever 28 is pivoted intermediate the ends of the cover 17 on the back thereof, as by means of a rivet 29, and has slight bosses 30 struck therefrom near the opposite ends thereof arranged to enter the slots 27 to hold the lever yieldingly in alignment with the cover against turning about the pivot 29. The opposite ends of the lever 28 are provided with slots 31, the slot at one end opening from one side and the slot at the other end opening from the other side of the lever, as shown in Fig. 1. These slots register with the holes 25 when the lever 28 is in alignment with the cover and held in such position by the bosses 30 in the slots 27.

In practice, the pressure plate assembly, insofar as the springs 15 with their covers 17 and levers 28 are concerned, will be in the form shown in Figs. 1 and 2 as it is shipped to the car manufacturer for assembly on the flywheel. The workman on the assembling floor turns the levers 28 to an out-of-the-way position, such as indicated in dotted lines in Fig. 1, whereupon the pressure plate can be slipped over the studs 13 until the ends of the studs 13 project through the holes 25. Now, it will be observed that the ends of the studs 13 are provided with annular grooves 32 so located that when the pressure plate 10 is brought into engagement with the clutch disc and brings the latter into engagement with the flywheel, the studs 13 are projecting through the covers 17 far enough to permit the slotted ends of the levers 28 to be engaged in said grooves, as shown in Figs. 3 and 4. The pins 22 can now be pulled out easily by means of pliers, especially if the clutch is released part way. Obviously, the pinholes 20' provided in the flanges 18 of the covers will not remain in register with the holes 20, especially as the clutch facings 9 become worn more and more, but release of the clutch produces relative movement between the pressure plate and the covers, and hence between the lugs 19 and the flanges 18, so that these holes can be brought into register to permit entering of pins therethrough for a purpose which I will now describe.

When the pressure plate is shipped to the car manufacturer the pins 22 are entered in the outer holes 20 and the springs 15 are held under a given load, estimated to be about right for the proper functioning of the clutch in its new and unworn condition. After some months of service the clutch facings will be found to show enough wear to make it advisable for a take-up to be made because the wear has caused the spring pressure to become too light and the clutch tends to slip easily. It has heretofore been the practice to place the pressure plate under a heavier than normal spring pressure at the time of assembling the clutch to compensate for this wear. The trouble with that practice was that the clutch on a new car was very hard to operate, especially for a lady driver, and there were apt to be complaints. According to my invention there will be no necessity for overloading at the beginning. It is a simple matter after the initial wear to simply release the clutch enough to bring the inner holes 21 on the lugs 19 in register with the holes 20' in the flanges 18 of the covers 17 to permit entering pins 22 therethrough. The holes 21 are spaced with reference to the holes 20 a distance equivalent to the average loss in thickness of the clutch disc facings for a given amount of mileage. Furthermore, the change in relationship between the covers 17 and the pressure plate 10 is enough to bring a second set of grooves 33 provided on the studs 13, correspondingly spaced with reference to the other set of grooves 32, in position for locking engagement with the slotted ends of the levers 28. Therefore, it is evident that the covers 17 are adjusted bodily inwardly on the studs 13 enough to compensate for the wear of the clutch facings 9 and make the same spring pressure available on the pressure plate 10 with the clutch in its worn condition as the clutch had when it was new. The wear of the clutch disc facings is found to be greater for the first few months service than it is later, so that there is usually no serious need for any further take-up for spring tensioning. However, it will be evident that a third set of pinholes and a correlated third set of grooves, or even fourth sets of holes and grooves, might be provided if desired, that being an obvious extension of the novel idea just described.

Each of the release levers 16 is stamped from sheet metal to a generally channel-shaped cross-section, thus affording the requisite strength and rigidity without involving excessive weight, and at the same time making for cheapness. The side flanges 34 of each lever have registering holes 35 punched therein for the reception of a rivet pin 36 for pivotally mounting the lever between spaced parallel lugs 37 cast integral with the pressure plate 10. The levers 16, of which there are three, as indicated above, are disposed in equally circumferentially spaced relation and extend substantially radially inwardly toward the axis of the clutch for engagement at their inner ends with the throw-out sleeve (not shown). A square stud 38 threadedly mounted on the flywheel 5, as indicated at 39, is provided for each of the release levers and has a close working fit in a slot 40 provided therefor in the pressure plate between the lugs 37. Thus the studs 38 act as guides for the pressure plate in the engaging and disengaging movements thereof, and also cause the same to turn with the flywheel. Each stud has the inner end thereof provided with a spheroidal socket 41 arranged to receive the rounded inner end of an adjustable set screw 42 threaded in the back of the release lever in a punched and tapped hole 43 provided in the latter. A lock nut 44 threaded on the projecting outer end of the set screw 42 is arranged when tightened to jam against the back of the release lever to lock the set screw in adjusted position. The car manufacturer fits each flywheel with studs 38 located in accordance with the specifications of the clutch to be used, and there is therefore no difficulty in getting the rounded inner ends of the set screws 42 to line up with the sockets 41 in the outer ends of the studs 38 in the assembling of the clutch. The set screws 42 are adjusted so that the inner ends of the release levers are all disposed in the same relation to the throw-out sleeve, the workman on the assembling floor being given definite instructions as to this adjustment. Later, after there has been a certain amount of wear, as for example, when the take-up is being made for spring tension, as above described, the set screws 42 will be adjusted to get the release levers 16 back to their original setting in relation to the throw-out sleeve, the screws being each backed up a few turns for that purpose. The lock nuts 44 when tightened serve to hold the set screws in adjusted position. U-shaped springs 45 are provided simply for the purpose of holding the levers 16 with the screws 42 engaging in the sockets 41, against the tendency of centrifugal force to swing the same outwardly with reference to the pressure plate. Each spring has engagement with a release lever by the crotch portion thereof near the inner end of the lever, and has the free ends of the arms thereof provided with one, two, or more coils 47 where the ends are entered through holes 48 provided in lugs 49 cast integral with the back of the pressure plate. The extremities of the spring are bent as shown at 50 to permanently assemble the spring on the pressure plate. Obviously, it is a simple matter in the assembling of the levers on the pressure plate to enter the ends of the springs 45 through the holes 48 and bend them over with the aid of pliers, or a hammer, or both. The springs form a part of the pressure plate assembly as the latter is received by the car manufacturer.

It is believed the foregoing description conveys a clear understanding of my invention and of its various objects and advantages. While I have made reference to various specific details of construction and arrangement, it should be evident that many changes might be made without seriously departing from the spirit and scope of the invention. The appended claims have, therefore, been drawn broadly enough to cover all legitimate modifications and adaptations coming within the purview of my invention.

I claim:

1. In a friction clutch, the combination with a driving element, such as a flywheel, and a driven element, such as a clutch disc, of a plurality of studs projecting rearwardly from the flywheel, a pressure plate having openings provided therein for the projection therethrough of said studs, springs on the back of the pressure plate about said openings, means for holding all of said springs caged in their assigned positions on the pressure plate so that they are all arranged to be brought into position over the studs at one time when the pressure plate is placed on the studs in the assembling thereof on the flywheel, means placed on the outer ends of said studs for holding the springs in assembled position and under compression whereby normally to urge the pressure plate toward the flywheel, and means for moving the pressure plate away from the flywheel against the action of said springs.

2. In a friction clutch, the combination with a driving element, such as a flywheel, and a driven element, such as a clutch disc, of a plurality of studs projecting rearwardly from the flywheel, a pressure plate having openings provided therein for the projection therethrough of said studs, springs on the back of the pressure plate about said openings, means for releasably holding all of said springs caged and under compression in their assigned positions on the pressure plate so that they are all arranged to be brought into position over the studs at one time when the pressure plate is placed on the studs in the assembling thereof on the flywheel, means placed on the outer ends of said studs for holding the springs in assembled position, said means serving to back up the springs and assume the pressure thereof when the last mentioned means is released, whereby the pressure plate is normally urged toward the flywheel under the action of said springs, and means for moving the pressure plate away from the flywheel against the action of said springs.

3. In a friction clutch, the combination with a driving element, such as a flywheel, and a driven element, such as a clutch disc, of a plurality of studs projecting rearwardly from the flywheel, a pressure plate having openings provided therein for the projection therethrough of said studs, springs on the back of the pressure plate about said openings, one or more cover members for holding said springs caged in their assigned positions on the pressure plate so that they are arranged to be brought into place over the studs at the same time when the pressure plate is placed on said studs in the assembling thereof on the flywheel, said covers having openings therein in register with the openings in the pressure plate through which the outer ends of the studs are arranged to be projected, means placed on the projecting ends of said studs behind the covers to hold the covers with the springs in assembled position with the springs under compression whereby normally to urge the pressure plate toward the flywheel, and means for moving the pressure plate away from the flywheel against the action of said springs.

4. In a friction clutch, the combination with a driving element, such as a flywheel, and a driven element, such as a clutch disc, of a plurality of studs projecting rearwardly from the flywheel, a pressure plate having openings provided therein for the projection therethrough of said studs, springs on the back of the pressure plate about said openings, one or more cover members for holding said springs caged and under compression in their assigned positions on the pressure plate, means for releasably securing the cover members to the pressure plate holding the springs in the manner described whereby to permit the placing of the springs over the studs on the flywheel at the same time when the pressure plate is placed over said studs in the assembling thereof on the flywheel, said covers having openings therein in register with the openings in the pressure plate through which the outer ends of said studs are arranged to be projected in the assembling operation, means placed on the projecting ends of the studs behind the covers to hold the springs and covers assembled on the studs, the same being arranged to assume the load of the springs when the covers are released from connection with the pressure plate whereby the pressure plate is normally urged toward the flywheel, and means for moving the pressure plate away from the flywheel against the action of said springs.

5. In a friction clutch, the combination with a driving element, such as a flywheel, and a driven element, such as a clutch disc, of a plurality of studs projecting rearwardly from the flywheel, a pressure plate having openings provided therein for the projection therethrough of said studs, springs on the back of the pressure plate about said openings, one or more cover members for holding said springs caged and under compression in their assigned positions on the pressure plate, means for releasably securing the cover members to the pressure plate holding the springs in the manner described whereby to permit the placing of the springs over the studs on the flywheel at the same time when the pressure plate is placed over said studs in the assembling thereof on the flywheel, said covers having openings therein in register with the openings in the pressure plate through which the outer ends of said studs are arranged to be projected in the assembling operation, the outer ends of the studs being provided with recesses, means carried on the back of the covers arranged to be engaged in said recesses to hold the springs and covers assembled on the studs, said means being arranged to assume the load of the springs when the covers are released from connection with the pressure plate whereby the pressure plate is normally urged toward the flywheel under the action of said springs, and means for moving the pressure plate away from the flywheel against the action of said springs.

6. In a friction clutch, the combination with a driving element, such as a flywheel, and a driven element, such as a clutch disc, of a plurality of studs projecting rearwardly from the flywheel, a pressure plate having openings provided therein for the projection therethrough of said studs, springs on the back of the pressure plate about said openings, one or more cover members for holding the springs caged in their assigned positions on the pressure plate, said covers being arranged to be releasably secured to the pressure plate holding the springs in the positions described whereby to permit the placing of all of the springs over the studs on the flywheel at the same time when the pressure plate is placed over said studs in the assembling thereof on the flywheel, the springs being arranged to be compressed and held under compression by the covers, said covers having openings therein in register with the openings in the pressure plate through which the outer ends of the studs are arranged to be projected, means placed on the projecting ends of the studs to hold the covers and springs assembled on the studs, the said means serving to assume the load of the springs whereby the pressure plate is normally urged toward the flywheel, and means for moving the pressure plate from the flywheel against the action of said springs.

7. A clutch as set forth in claim 6 wherein the means arranged to be placed on the projecting ends of said studs for holding the springs with the covers assembled on the studs comprises latch members mounted on the backs of the covers for movement toward and away from the projecting ends of the studs, the projecting ends of the studs being provided with recesses for the reception therein of portions of said latches.

8. A clutch as set forth in claim 6 wherein the means arranged to be placed on the outer ends of said studs for holding the springs with the covers assembled on the studs comprises latch members pivotally mounted on the backs of the covers and arranged to be turned relative to the cover toward and away from the projecting ends of the studs, the latter having recesses provided therein for reception of portions of said latches.

9. A clutch as set forth in claim 6 wherein the means arranged to be placed on the outer ends of said studs for holding the springs with the covers assembled on the studs comprises latch members, each associated with a cover and a pair of adjoining studs and pivotally mounted intermediate the ends thereof on the back of the cover for swinging movement relative thereto to bring the ends thereof toward and away from engagement with the projecting ends of the studs, the opposite ends of each latch having slots provided therein, the one opening from one side edge and the other opening from the opposite side edge of the latch, and the projecting ends of said studs being provided with grooves wherein the slotted portions of the latches are arranged to be entered.

10. A clutch as set forth in claim 6 wherein the means arranged to be placed on the projecting ends of said studs for holding the springs with the covers assembled on the studs comprises latch members mounted on the backs of the covers for movement toward and away from the projecting ends of the studs, the projecting ends of the studs being provided with recesses for the reception therein of portions of said latches, and including means for holding the latches in closed position.

11. A clutch as set forth in claim 6 wherein the means arranged to be placed on the projecting ends of said studs for holding the springs with the covers assembled on the studs comprises latch members mounted on the backs of the covers for movement toward and away from the projecting ends of the studs, the projecting ends of the studs being provided with recesses for the reception therein of portions of said latches, and including means for holding the latches in closed position comprising one or more openings in one of the relatively swingable parts arranged to receive one or more projections provided on the other part.

12. In a friction clutch, the combination with a driving element, such as a flywheel, and a driven element, such as a clutch disc, of a plurality of studs projecting rearwardly from the flywheel, a pressure plate having openings provided therein for the projection therethrough of said studs, springs on the back of the pressure plate about said openings, one or more cover members for holding the springs caged in their assigned positions on the pressure plate whereby all of the springs are arranged to be placed over the studs on the flywheel in one operation when the pressure plate is placed over the studs in the assembling thereof on the flywheel, said cover members serving as a medium for placing the springs under compression, the pressure plate having projections reaching toward the covers and the covers having portions projecting toward the same arranged to be quickly releasably attached thereto, as by means of pins passed through registering openings provided therein, said covers having openings provided therein registering with the openings provided in the pressure plate through which the outer ends of the studs are arranged to be projected in the assembling operation, means placed on the outer ends of said studs to hold the covers with the springs assembled on the studs, the said means serving to assume the load of the springs when the covers are disconnected from the pressure plate whereby the latter is normally urged toward the flywheel under the action of said springs, and means for moving the pressure plate away from the flywheel against the action of said spring.

13. A clutch as set forth in claim 12 wherein the means placed on the outer ends of said studs to hold the springs with the covers assembled on the studs comprises latch members mounted on the backs of the covers for movement toward and away from the projecting ends of the studs, the latter having recesses provided in the outer ends thereof for engagement therein of said latch members.

14. In a friction clutch, the combination with a driving element, such as a flywheel, and a driven element, such as a clutch disc, of a plurality of studs projecting rearwardly from the flywheel, a pressure plate having openings provided therein for the projection therethrough of said studs, springs on the back of the pressure plate about said openings, one or more cover members for holding the springs caged in their assigned positions on the pressure plate whereby all of the springs are arranged to be placed over the studs on the flywheel in one operation when the pressure plate is placed over the studs in the assembling thereof on the flywheel, said cover members serving as a medium for placing the springs under compression, the pressure plate having projections reaching toward the covers and the covers having portions projecting toward the same arranged to be quickly releasably attached thereto, as by means of pins passed through registering openings provided therein, said covers having openings provided therein registering with the openings provided in the pressure plate through which the outer ends of the studs are arranged to be projected in the assembling operation, latching means on the backs of the covers arranged to be engaged in recesses provided in the outer ends of said studs whereby to hold the springs with the covers assembled on the studs, the said means serving to assume the load of the springs when the covers are released from connection with the pressure plate whereby the latter is normally urged toward the flywheel, there being a plurality of recesses in said studs for reception of the latching means in different positions of the covers for the purpose herein described and the covers being adapted to be detachably secured to the pressure plate in different positions holding the springs in different degrees of compression for the purpose herein described, and means for moving the pressure plate away from the flywheel against the action of said springs.

15. In a friction clutch, the combination with a driving element, such as a flywheel, and a driven element, such as a clutch disc, of a plurality of studs projecting rearwardly from the flywheel, a pressure plate having openings provided therein for the projection therethrough of said studs, springs on the back of the pressure plate about said openings, a cover member for each pair of adjoining springs serving to hold the same caged in their assigned positions on the pressure plate, there being a projection on the back of the pressure plate reaching toward each cover, the projections each having a transverse hole therethrough and the covers having portions having registering holes to permit the passage of a pin or the equivalent therethrough for detachably securing the covers to the pressure plate, the springs being thus arranged to be passed over the studs at the same time when the pressure plate is placed over the studs in the assembling thereof on the flywheel, said springs being arranged to be placed under compression through the medium of said covers, said covers having openings therein registering with the openings in the pressure plate through which the outer ends of the studs are arranged to be projected in the assembling operation, means placed on the projecting ends of said studs behind the covers to hold the springs with the covers assembled on the studs with the springs under compression, and means for moving the pressure plate away from the flywheel against the action of said springs.

16. In a friction clutch, the combination with a driving element, such as a flywheel, and a driven element, such as a clutch disc, of a plurality of studs projecting rearwardly from the flywheel, a pressure plate having openings provided therein for the projection therethrough of said studs, springs on the back of the pressure plate about said openings, a cover member for each pair of adjoining springs serving to hold the same caged in their assigned positions on the pressure plate, each of said covers being formed from sheet metal to substantially channel-shaped cross-section, there being a projection on the back of the pressure plate reaching toward each cover between the flanges thereof, the projections each having a transverse hole therethrough and the flanges having registering holes to permit the passage of a pin or the equivalent therethrough for detachably securing the covers to the pressure plate, the springs being thus arranged to be passed over the studs at the same time when the pressure plate is placed over the studs in the assembling thereof on the flywheel, said springs being arranged to be placed under compression through the medium of said covers, said covers having openings therein registering with the openings in the pressure plate through which the outer ends of the studs are arranged to be projected in the assembling operation, means placed on the projecting ends of said studs behind the covers to hold the springs with the covers assembled on the studs with the springs under compression, and means for moving the pressure plate away from the flywheel against the action of said springs.

17. A clutch as set forth in claim 15 wherein each cover is arranged to be pinned onto the pressure plate with the springs held caged under compression, and wherein the means placed on the outer ends of the studs to hold the springs with the cover assembled on the studs comprises latching means on the back of the cover arranged to be engaged in recesses provided therefor in the outer ends of the studs, the said latching means being arranged to assume the load of the springs when the cover is released from connection with the pressure plate.

18. A clutch as set forth in claim 15 wherein each cover is arranged to be pinned onto the pressure plate with the springs held caged under compression, and wherein the means placed on the outer ends of the studs to hold the springs with the cover assembled on the studs comprises latching means on the back of the cover arranged to be engaged in recesse provided therefor in the outer ends of the studs, the said latching means being arranged to assume the load of the springs when the cover is released from connection with the pressure plate, the cover being arranged to be pinned to the pressure plate in different positions with the springs placed under different degrees of compression, and the outer ends of the studs being provided with a plurality of recesses arranged to receive the latch means in different positions of the cover for the purpose described.

19. A clutch as set forth in claim 3 wherein the means placed on the outer ends of said studs for holding the springs in assembled position comprises latches mounted on the backs of the covers arranged to be moved into engagement in recesses provided therefor in the outer ends of said studs, there being a plurality of sets of said recesses, each set of recesses being in the same plane, and said latches being engageable selectively in either set of recesses whereby to hold the springs under a desired amount of compression.

20. In a friction clutch, the combination with a driving element, such as a flywheel, and a driven element, such as a clutch disc, of a plurality of studs projecting rearwardly from the flywheel, a pressure plate having openings provided therein for the projection therethrough of said studs, springs on the back of the pressure plate about said openings, one or more cover members for holding said springs caged in their assigned positions on the pressure plate, means for releasably securing the cover members to the pressure plate holding the springs in the manner described whereby to permit the placing of the springs over the studs on the flywheel at the same time when the pressure plate is placed over said studs in the assembling thereof on the flywheel, said covers having openings therein in register with the openings in the pressure plate through which the outer ends of said studs are arranged to be projected in the assembling operation, the outer ends of the studs being provided with recesses, means carried on the back of the covers arranged to be engaged in said recesses to hold the springs and covers assembled on the studs, said means being arranged to assume the load of the springs in compressed condition when the covers are released from connection with the pressure plate whereby the pressure plate is normally urged toward the flywheel under the action of said springs, and means for moving the pressure plate away from the flywheel against the action of said springs.

21. A clutch as set forth in claim 6 wherein the means arranged to be placed on the outer ends of said studs for holding the springs with the covers assembled on the studs comprises latch members, each associated with a cover and a pair of adjoining studs and pivotally mounted intermediate the ends thereof on the back of the cover for pivotal movement relative thereto to bring the ends thereof toward and away from engagement with the projecting ends of the studs, and the projecting ends of said studs being provided with recesses for reception of the ends of the latches.

22. A clutch as set forth in claim 12 wherein the projections on the pressure plate are arranged to be quickly releasably attached to the portions of the covers in either one of a plurality of positions, as by means of pins passed through openings adapted to register in the different positions of the cover with respect to the pressure plate.

23. In a friction clutch, the combination with a driving element, such as a flywheel, and a driven element, such as a clutch disc, of a plurality of studs projecting rearwardly from the flywheel, a pressure plate having openings provided therein for the projection therethrough of said studs, springs on the back of the pressure plate about said openings, one or more cover members for holding the springs caged in their assigned positions on the pressure plate whereby all of the springs are arranged to be placed over the studs on the flywheel in one operation when the pressure plate is placed over the studs in the assembling thereof on the flywheel, said cover members serving as a medium for placing the springs under compression, the pressure plate having projections reaching toward the covers and the covers having portions projecting toward the same arranged to be quickly releasably attached thereto, as by means of pins passed through registering openings provided therein, said covers having openings provided therein registering with the openings provided in the pressure plate through which the outer ends of the studs are arranged to be projected in the assembling operation, latching means on the backs of the covers arranged to be engaged in recesses provided in the outer ends of said studs whereby to hold the springs with the covers assembled on the studs, the said means serving to assume the load of the springs when the covers are released from connection with the pressure plate whereby the latter is normally urged toward the flywheel, there being a plurality of recesses in said studs for reception of the latching means in different positions of the covers for the purpose herein described, and means for moving the pressure plate away from the flywheel against the action of said springs.

In witness of the foregoing I affix my signature.

WILLIAM F. HUGHES.